Dec. 9, 1952        L. D. BARRETT        2,621,018
TURBINE ROTOR CONSTRUCTION
Filed Feb. 1, 1950
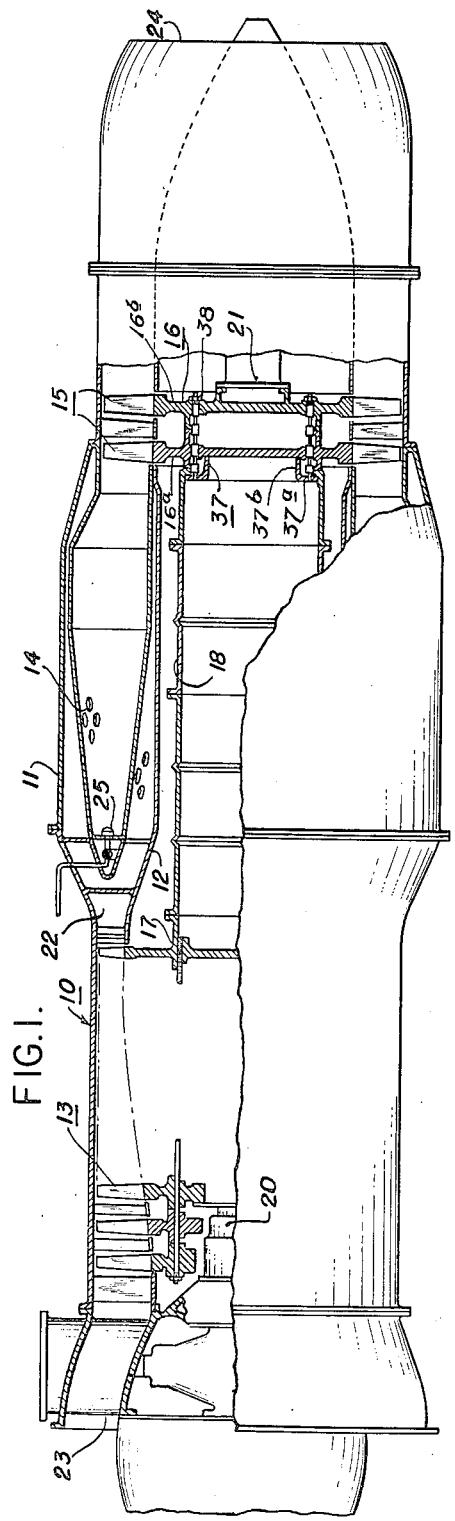
INVENTOR
LAWRENCE D. BARRETT
BY *Ralph T. French*
ATTORNEY Patented Dec. 9, 1952

2,621,018

UNITED STATES PATENT OFFICE 2,621,018

TURBINE ROTOR CONSTRUCTION

Lawrence D. Barrett, Glen Mills, Pa., assignor to Westinghouse Electric Corporation, East Pittsburgh, Pa., a corporation of Pennsylvania Application February 1, 1950, Serial No. 141,698

4 Claims. (Cl. 253—69)

This invention relates to rotors for turbines or compressors, and more particularly to a disc and shaft assembly for a gas turbine power plant.

It is an object of the invention to provide improved means for securing together the component parts of a rotor for a turbine or the like.

Another object of the invention is the provision of improved means for bolting one or more turbine discs to a relatively thin-walled tubular shaft member without concentrating stresses on the latter at points adjacent the bolts.

A feature of the invention consists in the use of an annular angle member or clamping element having one flange engageable with an annular shoulder formed on a tubular shaft and another flange abutting a disc surface of the turbine assembly, together with bolts securing the disc to the clamping element and consequently locking the turbine assembly to the tubular shaft.

It is a further object to provide an improved tubular shaft and turbine disc assembly including a flexible ring which bears against the shaft and adjacent disc when the elements are bolted together, thereby minimizing the bending moment in the shaft and permitting use of a relatively thin-walled shaft structure.

These and other objects are effected by my invention as will be apparent from the following description and claims taken in connection with the accompanying drawings, forming a part of this application, in which:

Fig. 1 is an elevational view, partly in section, of an aviation gas turbine power plant having a turbine constructed in accordance with the invention;

Fig. 2 is an enlarged detail sectional view of the turbine disc and shaft assembly of the apparatus shown in Fig. 1; and Fig. 3 is a perspective view of the annular clamping member shown in Fig. 2.

In Fig. 1 of the drawings, there is illustrated a typical aviation gas turbine engine 10, comprising a generally cylindrical outer casing structure 11, in which are mounted a core structure 12 and operating elements including an axial flow compressor 13, combustion apparatus 14 and a turbine 15, the rotor 16 of which is connected to the rotor 17 of the compressor by means of a sectional tubular shaft 18. The compressor rotor 17, shaft 18 and turbine rotor 16 are journaled on suitable bearings at 20 and 21. These elements are disposed along the axis of the casing and core structures 11 and 12, in which is formed an annular passageway generally indicated at 22, extending from a frontal air intake opening 23, to a rearwardly disposed discharge nozzle 24.

The power plant 10 is adapted to be mounted in an aircraft (not shown) with the intake 20 directed forwardly. In operation, air entering the intake opening 23 is compressed and delivered by the compressor 13 to the combustion apparatus 14, where fuel supplied through nozzles 25 is burned to provide hot motive fluid, which, when partly expanded through the turbine 15 and discharged in the form of a jet through the nozzle 24, is utilized for imparting a propulsive thrust to the aircraft.

As best shown in Fig. 2, the shaft 18 and the discs of the turbine rotor 16 are connected by means of bolts. Thus, the section of the thin-walled tubular shaft 18 adjacent the turbine rotor 16 is reduced in diameter or inswept and terminates in an annular serrated or radially toothed portion 30, which is adapted to engage a complementary annular toothed portion 31 of the adjacent disc 16a of the turbine rotor. A similar annular toothed portion 32 of the disc 16a is disposed in interlocking engagement with a complementary portion 33 of a second stage disc 16b of the turbine rotor 16. It will be noted that these annular interlocking portions of the shaft and turbine rotor are of substantially the same diameter as that of the tubular shaft. Each of the turbine discs 16a and 16b has a bolting portion having formed therein a suitable number of uniformly spaced registering openings for receiving a plurality of axially disposed bolts 35, which are mounted adjacent and radially inwardly of the portions 30 to 33, inclusive. The bolts 35 are preferably provided with enlarged portions engageable with the interlocked portions of the turbine disc assembly, as shown in Fig. 2 for limiting stresses due to centrifugal force.

According to the invention, the desirable lightweight structure of the tubular shaft 18 is not burdened with a conventional bolting flange for receiving the bolts 35, but instead, a relatively narrow inner annular shoulder 36 is formed near the end of the shaft section carrying the toothed portion 30 for engagement by a radial surface of a flexible annular bolting element or clamping ring 37 of L-shaped cross section. The clamping ring 37 has a radially extending annular body flange 37a and a somewhat reduced and tapered annular flange 37b extending in substantially right-angular relation thereto. The body flange 37a is adapted to extend radially in overlapping relation with the shoulder 36 and is provided with a suitable number of threaded bores for receiving threaded ends 35a of the bolts 35, while the end surface of the flange 37b is adapted to underlie the portions 30 and 31 and to be brought into abutting relation with an annular surface of the turbine disc 16a upon assembly of the shaft and turbine structure. A plurality of nuts 38, applied to the opposite ends of the respective bolts 35 adjacent the disc 16b, complete the turbine assembly. Preferably, a few one-thousandths of an inch initial clearance may be provided between the butt end of the clamping ring flange 37b and the disc 16a, in order to allow proper alignment of the flexible clamping ring 37 with the associated elements of the turbine assembly as the bolts 35 are tightened.

From the foregoing, it will thus be seen that by utilizing the clamping ring 37 of angular cross section for carrying and uniformly distributing the load imposed on the thin tubular shaft 18 by the turbine assembly bolts, while reducing the bending moment on the shaft, an improved rotor structure of adequate strength and minimum mass is provided, while convenience of assembly and critical alignment of the component parts is ensured.

What I claim is:

1. A rotor assembly comprising a blade-carrying disc having an apertured bolting portion, a tubular shaft having an inner annular shoulder extending radially inwardly and formed adjacent an end thereof, a clamping ring of L-shaped cross section having one annular flange extending parallel to the ring axis and another annular flange extending radially outwardly, said ring being disposed with the radially extending flange engaging said annular shoulder in radially overlapping relation and the other flange spaced radially inwardly of the perimeter of said shaft and extending axially thereof into cooperative relation with said disc radially inwardly of the bolting portion, said radially extending flange having apertures formed inwardly of said shaft shoulder and aligned respectively with the apertures in said bolting portion of the disc, and bolts extending through said aligned apertures and engaging said clamping ring and said disc for securing the latter to said shaft without impressing local stresses on the relatively thin wall of the shaft.

2. In a rotor for a turbine or the like, an assembly of bladed discs having annular interlocking toothed portions and registering bolt openings formed radially inwardly of said interlocking portions, a cylindrical shaft having a toothed end in engagement with the toothed portion of one of the discs of said assembly radially outwardly of the bolt openings thereof, said shaft having an annular shoulder formed thereon near said end, a clamping ring disposed concentrically within said shaft and having a peripheral portion spaced from said disc assembly and engaging said shoulder in radially overlapping relation, said ring having an interior annular flange spaced within said shaft and abutting said disc assembly, said ring having bolt openings intermediate said peripheral portion and said flange and aligned with the bolt openings of said discs, and bolts mounted in said openings and engaging said clamping ring and said assembly of discs for securing said discs to said clamping ring and consequently to said shaft.

3. A rotor assembly comprising a blade-carrying disc having an apertured bolting portion, a tubular shaft having an annular shoulder formed adjacent an end thereof, a clamping ring of L-shaped cross section disposed coaxially of the shaft and comprising a thick annular flange extending radially outwardly and a relatively thin tapered annular flange extending parallel to the ring axis, said ring being disposed with the peripheral portion of said radial flange engaging said annular shoulder in radially overlapping relation and the other flange spaced inwardly of said shaft and abutting said disc radially inwardly of the bolting portion, said radially extending flange having apertures formed inwardly of the peripheral portion which radially overlaps said shaft shoulder and aligned with the respective apertures of said bolting portion of the disc, and a plurality of bolts mounted in said aligned apertures and engaging the clamping ring and disc for securing the latter to the shaft without imposing local stresses on the relatively thin wall of the shaft.

4. In a rotor for a turbine or the like, an assembly of bladed discs having annular interlocking toothed portions and registering bolt openings formed radially inwardly of said interlocking portions, a cylindrical shaft having an inswept, toothed end mounted in engagement with the toothed portion of one of the discs of said assembly radially outwardly of the bolt openings thereof, said shaft having an inner annular radially disposed shoulder formed thereon in concentric alignment with said inswept, toothed end, a clamping ring disposed concentrically within said shaft and having a peripheral portion radially overlapping said shoulder and disposed in engagement with said shoulder, said ring having an inner annular flange spaced within said shaft and extending parallel thereto to abut said disc assembly, and securing means including a plurality of bolts engaging said clamping ring and said discs for securing the latter to said shaft.

LAWRENCE D. BARRETT.

REFERENCES CITED

The following references are of record in the file of this patent:

UNITED STATES PATENTS

| Number | Name | Date |
|---|---|---|
| 1,186,438 | Roder | June 6, 1916 |
| 2,401,826 | Halford | June 11, 1946 |
| 2,427,614 | Meier | Sept. 16, 1947 |
| 2,470,780 | Ledwith | May 24, 1949 |

FOREIGN PATENTS

| Number | Country | Date |
|---|---|---|
| 492,252 | Germany | Feb. 20, 1930 |